July 23, 1957 H. BURG 2,800,093
APPARATUS FOR BURNING PULVERIZED FUEL
Filed Feb. 8, 1952
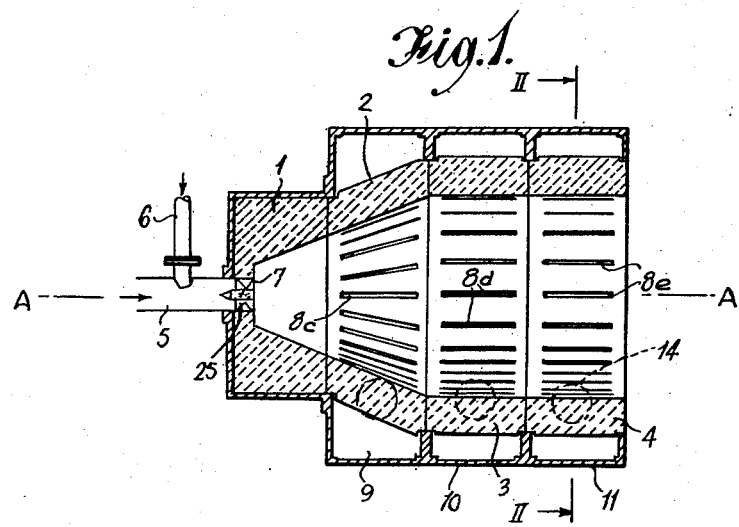
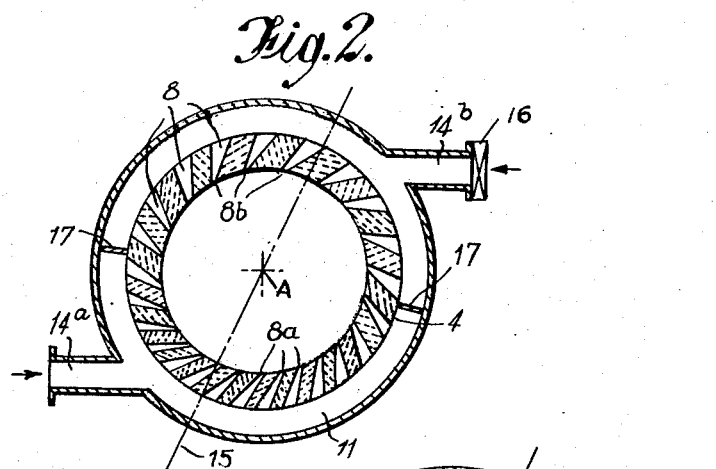
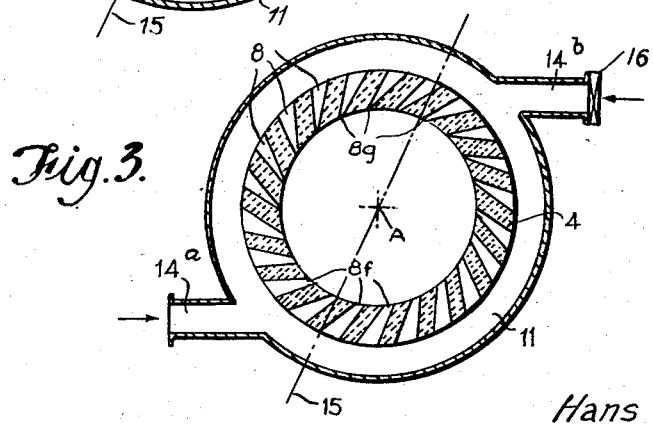
Inventor
Hans Burg
By
Attorney

United States Patent Office 2,800,093
Patented July 23, 1957

2,800,093
APPARATUS FOR BURNING PULVERIZED FUEL

Hans Burg, Essen, Germany, assignor of one-half to Pollopas Patents Limited, London, England, a British company Application February 8, 1952, Serial No. 270,670
Claims priority, application Great Britain June 13, 1951

5 Claims. (Cl. 110—28)

Pulverised fuel burners are already known in which pulverised fuel, mixed with air or gas (herein called "primary gas"), is injected into a combustion chamber through a burner orifice which imparts a rotary motion to the fuel-primary gas mixture leaving the burner orifice, this mixture being ignited to produce a turbulent flame, and in which the surrounding walls of the combustion chamber are provided with inlet apertures distributed therearound through which secondary combustion means, for example air or fuel gases (herein called "secondary gas"), is supplied to produce jets of secondary gas in a direction substantially tangential to the flame, thereby to produce a sleeve of secondary gas around the flame which rotates in the same direction of rotation as the fuel mixture leaving the burner orifice, this sleeve serving to maintain the jet of flame in floating rotary movement and completely to burn the fuel, any unburnt heavy fuel particles thrown outwardly by centrifugal force being forced back into the flame by this rotating sleeve of secondary gas and being burnt by the heat radiated from the flame and the surrounding walls of the combustion chamber.

The present invention has for an object to provide an improved construction of combustion chamber which improves the combustion of the fuel, particularly when fuels having a low volatile content are burnt.

Hitherto secondary gas has been admitted into the combustion chamber at points along the length thereof extending from the burner orifice to the remote end of the combustion chamber. I have found that the combustion can be improved by admitting secondary gas only at points in the combustion chamber which are spaced away from the burner orifice, the zone of the combustion chamber immediately adjacent the burner orifice being imperforate and constructed with a tapering internal surface so as to constitute a radiation head by means of which heat from the flame will be reflected into the combustion chamber.

According to a feature of the invention, the rate of admission of secondary gas increases with increasing distance from the radiation head towards the remote end of the combustion chamber up to a maximum value. Preferably the combustion chamber is constructed of a plurality of sections arranged end to end, the rate of admission of secondary gas to the inlets in the different sections being separately controllable so as to obtain the desired rates of admission at the different sections.

The radiation head causes the generation of increased combustion heat and by reason of the conical, paraboloidal, hyperboloidal or like configuration of its internal surface, radiates the heat in the direction towards the part of the combustion chamber provided with inlets for secondary gas.

According to a further feature of the invention, the quantity of secondary gas admitted to the lower portion of the combustion chamber is maintained greater than that admitted to the upper portion of the combustion chamber in order to provide additional support for the flame and to supply an increased quantity of oxygen to the heavy fuel particles which, due to gravity, tend to sink downwardly from the flame, thereby facilitating their combustion whilst at the same time whirling these particles back into the flame. The admission of an increased quantity of secondary gas to the lower portion of the combustion chamber may be effected by providing an increased number of inlet apertures in the lower portion of the combustion chamber or by providing the lower portion of the combustion chamber with inlet apertures of greater cross-sectional area. Alternatively, or in addition, the pressure of the secondary gas applied to the lower portion of the combustion chamber may be greater than that applied to the upper portion.

The combustion chamber according to the present invention is particularly suitable for incorporation in the apparatus described in the specification of co-pending application Serial No. 270,667, filed February 8, 1952, for burning fuels of low volatile content, such as anthracite and coke, and also low grade fuels of high ash content, such for example as duff, residues from coal washing plant, which contain about 30% of ash.

An embodiment according to the present invention is illustrated in the accompanying drawing in which:

Figure 1 is a longitudinal section through the combustion chamber and

Figure 2 is a cross-section on the line 2—2 of Figure 1.

Figure 3 is a similar cross-section of a modified embodiment.

The combustion chamber illustrated in the drawing has a substantially horizontal axis A—A and is built up of four axially adjacent sections 1, 2, 3, 4, each of circular cross-section, the first two sections 1 and 2 being conically flared whilst the sections 3 and 4 are cylindrical. Coaxial with the combustion chamber and extending through an aperture in the end wall of the section 1 is the burner tube 5 to which primary air is fed and mixed with pulverised fuel admitted through the inlet pipe 6 under control of control means (not shown). To the fuel-air mixture leaving the burner orifice 7, is imparted a rotary motion, for example by means of the helical vanes 25 located in the burner orifice.

Section 1 of the combustion chamber constitutes the radiation head, its cone-shaped inner lining of refractory material acting to reflect the heat from the flame in a direction towards the other sections of the combustion chamber. The term "refractory," as used in this application, means a non-metallic substance fusible with difficulty and suitable for saggers, crucibles, construction of lining of furnaces, etc., where high temperatures must be withstood. The surface of the wall of section 1 is imperforate and substantially smooth. Sections 2, 3 and 4 forming the remainder of the combustion chamber also have substantially smooth wall surfaces but are provided with inlets 8 through which secondary air can be introduced into the combustion chamber.

As will be seen from Figure 2 these inlets are formed as nozzles 8 which penetrate the peripheral wall of the combustion chamber at an angle both to the tangential and radial directions and preferably at an angle of approximately 30° to the tangential direction so that the secondary air is admitted through these inlets in a direction tangential to the core of the flame and confines it to a diameter of two-thirds to three-quarters of the internal diameter of the combustion chamber, forming a sleeve of secondary air about the flame which rotates in the same direction as the flame. Secondary air is supplied under pressure to the jackets 9, 10 and 11 surrounding the refractory wall sections 2, 3 and 4, the quantity of secondary air admitted to each of the sections being controlled by means of control valves controlling the supply of air to the supply connections 14a and 14b of the respective jackets substantially as described and illustrated in my said co-pending application.

The rate of admission of secondary air to the different sections is adjusted to increase to a maximum with increasing distance from the radiation head. Thus the first section 2 of the combustion chamber adjacent the radiation head is given a smaller supply of secondary air than the following sections of the combustion chamber, either the last section 4 or the penultimate section 3 of the combustion chamber receiving the maximum quantity of secondary gas according to the kind of fuel to be burnt. In the illustrated embodiment accordingly the total cross-section of the openings of the nozzles 8c is for this reason smaller than that of the nozzles 8d, while that of the nozzles 8e in the last section is still greater than that of the nozzles 8d.

Since the radiation head 1 is imperforate and no sleeve of secondary air is formed therein, the wall surface of the radiation head becomes extremely hot which makes possible the creation of very high temperatures within the combustion chamber with liquid removal of slags from the pulverised fuel flame which is propagated in a turbulent manner from the burner orifice 7 and permits the use of fuels requiring and producing extraordinarily high temperatures, for example fuels of high ash content.

According to a feature of the invention, a greater quantity of secondary air is admitted to the lower portions of the combustion chamber than to the upper portions. This may be achieved, as will be seen from Figure 2, by providing a greater number of inlet apertures for secondary air at the bottom of the combustion chamber below the axis thereof than at the top above said axis. This arrangement counteracts the tendency of the flame to drop below its axial position in the combustion chamber, and also provides an additional oxygen supply to assist complete combustion of heavy particles of fuel which tend to fall, by reason of gravity, to the lower region of the flame, these particles being whirled back into the flame by the secondary air.

The distribution of the inlet apertures for secondary air are not arranged uniformly with respect to a vertical axis but to an inclined axis, as shown by the dotted line 15 in Figure 2, since the secondary air is not admitted radially but substantially tangentially and the arrangements of the apertures should be so disposed that the flame will only be supported vertically and not shifted transversely.

In addition to or instead of providing a greater number of inlet apertures in the lower half of the combustion chamber, below the axis thereof, than above said axis, a similar effect may also be obtained by making the inlets 8b in the lower half of the combustion chamber of greater individual cross-sectional area than the corresponding inlets 8g in the upper half, as shown in Fig. 3. A third way for obtaining a similar result, which may likewise be employed jointly with either or both of the previously described ways or independently thereof, consists in supplying the secondary air at a higher pressure to the apertures 8a in the lower half of the combustion chamber than to the apertures 8b in the upper half thereof. For this purpose the jackets 9, 10 and 11 may each be subdivided by partitions as shown at 17 in Fig. 2, and either separate pumps or equivalent means supplying air under different pressures may be connected to the connections 14a and 14b respectively for the two parts of each jacket, or pressure-reducing means 16 may be connected in series to the supply connection 14b for the upper half of each jacket.

Whilst a particular embodiment has been described, it will be understood that various modifications may be made without departing from the scope of the invention. Thus the internal surface of the radiation head may be other than conical provided that it is so shaped as to reflect the heat from the flame into the combustion chamber. Furthermore the axial length of the radiation head will depend upon the particular fuel to be burnt.

The increased admission of secondary air to the lower portions of the combustion chamber may be achieved by increasing the size of the secondary air inlets at the bottom portion of the combustion chamber instead of increasing their number, or alternatively by increasing the pressure of the secondary air through the lower inlets, for which purpose the air jackets surrounding the combustion chamber wall may be divided into upper or lower sections by partitions. Further, the radiation head may be of any other suitable configuration or may be omitted entirely, in which case apertures for admission of secondary air would also be provided in section 1 of the combustion chamber.

The combustion chamber walls may be constructed in any suitable manner, for example from bricks which are assembled together in spaced relation to define the inlet passages, or by means of a refractory lining carried by a suitable support.

I claim:

1. In or for apparatus for burning pulverised fuel, the combination of a substantially tubular refractory wall forming a combustion chamber having a substantially horizontal axis, a burner having a burner orifice leading into said chamber in a substantially axial direction thereof, means for causing a fuel-air mixture to pass through said burner orifice to form a flame in the chamber, means for imparting a rotary motion to the mixture leaving said orifice, and means including a plurality of gas inlets of fixed cross-sectional area distributed around said peripheral wall for the admission of gas into said chamber, said gas inlets being directed substantially tangentially to said flame to produce around the flame a sleeve of gas rotating in the same direction as the mixture leaving said orifice, some of said gas inlets being arranged above and others below the axis of the combustion chamber, and the total cross-sectional area of the gas inlets arranged below the axis of the combustion chamber being greater than the total cross-sectional area of the inlets arranged above said axis.

2. A combination as claimed in claim 1, wherein a greater number of inlet apertures are provided below the axis of the combustion chamber than above said axis.

3. A combination as claimed in claim 1, wherein the cross-sectional areas of the individual inlets arranged below the axis of the combustion chamber are greater than the individual cross-sectional areas of the inlets arranged above said axis.

4. The combination as claimed in claim 1, wherein the combustion chamber is closed at one end, the burner orifice being arranged in said closed end, and said inlet nozzles being spaced from said end by a zone in which said peripheral wall is imperforate and flared towards the other end of the chamber.

5. A method of burning pulverised fuel, comprising injecting the fuel together with part of the combustion air substantially axially into an approximately horizontally disposed tubular refractory combustion chamber at one end thereof while imparting to the fuel particles a swirling motion around the axis of the chamber, introducing further combustion air throughout the length of the combustion chamber from all sides thereof at an angle to the radial direction to form a sleeve of air rotating in the direction of said swirling motion, the total rate of supply of such further air into the part of the chamber located below the axis of the chamber being greater than the total rate of supply of such further air into the part located above said axis.

References Cited in the file of this patent

UNITED STATES PATENTS

| | | |
|---|---|---|
| 1,762,505 | Burg | June 10, 1930 |
| 1,918,397 | Jezler | July 18, 1933 |
| 2,368,827 | Hanson et al. | Feb. 6, 1945 |
| 2,395,103 | Clausen et al. | Feb. 19, 1946 |
| 2,500,925 | Bonvillian et al. | Mar. 21, 1950 |

FOREIGN PATENTS

| | | |
|---|---|---|
| 518,173 | Germany | Nov. 24, 1931 |
| 675,113 | Germany | Apr. 28, 1939 |